United States Patent
Tischer et al.

(10) Patent No.: US 7,536,156 B2
(45) Date of Patent: May 19, 2009

(54) DISPOSABLE, PROXIMITY-BASED COMMUNICATIONS SYSTEMS, DEVICES AND METHODS

(75) Inventors: Steven Tischer, Atlanta, GA (US); Samuel N. Zellner, Dunwoody, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 618 days.

(21) Appl. No.: 11/013,126

(22) Filed: Dec. 15, 2004

(65) Prior Publication Data

US 2006/0128447 A1 Jun. 15, 2006

(51) Int. Cl.
*H04B 1/38* (2006.01)
(52) U.S. Cl. ............... 455/90.3; 455/575.1; 455/41.2; 455/556.1
(58) Field of Classification Search ............... 455/575.1, 455/41.2, 563, 566, 407, 343.1, 410, 11.1, 455/26.1, 500, 558, 569.1, 422, 557, 73, 455/466, 41.3, 903.3, 556.1, 90.2, 95, 555, 455/552.1; 340/572.9, 572.1; 380/43; 370/310, 370/401
See application file for complete search history.

(56) References Cited

U.S. PATENT DOCUMENTS

| | | | | |
|---|---|---|---|---|
| 4,783,799 A | * | 11/1988 | Maass | ............ 380/43 |
| 5,681,200 A | * | 10/1997 | Shecter | ............ 446/76 |
| 6,112,077 A | * | 8/2000 | Spitaletta et al. | ............ 455/407 |
| D467,566 S | * | 12/2002 | Mirabelli et al. | ............ D14/137 |
| D467,888 S | * | 12/2002 | Mirabelli et al. | ............ D14/137 |
| 2004/0005914 A1 | * | 1/2004 | Dear | ............ 455/563 |
| 2004/0063463 A1 | * | 4/2004 | Boivin | ............ 455/558 |
| 2004/0150525 A1 | * | 8/2004 | Wilson et al. | ............ 340/572.1 |
| 2004/0192383 A1 | * | 9/2004 | Zacks et al. | ............ 455/557 |
| 2004/0204169 A1 | * | 10/2004 | Goradesky | ............ 455/569.1 |
| 2005/0022924 A1 | * | 2/2005 | Blackburn | ............ 156/230 |
| 2005/0052282 A1 | * | 3/2005 | Rodgers et al. | ............ 340/572.1 |
| 2005/0193893 A1 | * | 9/2005 | Poston | ............ 99/342 |
| 2005/0215195 A1 | * | 9/2005 | Light et al. | ............ 455/41.2 |
| 2005/0226201 A1 | * | 10/2005 | McMillin | ............ 370/348 |
| 2005/0259604 A1 | * | 11/2005 | Salmi | ............ 370/310 |
| 2006/0141941 A1 | * | 6/2006 | Zacks et al. | ............ 455/73 |
| 2006/0187065 A1 | * | 8/2006 | Girvin et al. | ............ 340/572.9 |
| 2006/0247042 A1 | * | 11/2006 | Walker et al. | ............ 463/29 |
| 2006/0252457 A1 | * | 11/2006 | Schrager | ............ 455/556.1 |
| 2007/0202900 A1 | * | 8/2007 | Inselberg | ............ 455/500 |
| 2008/0014917 A1 | * | 1/2008 | Rhoads et al. | ............ 455/422.1 |

* cited by examiner

*Primary Examiner*—Tan Trinh
(74) *Attorney, Agent, or Firm*—Myers Bigel Sibley & Sajovec, P.A.

(57) ABSTRACT

A disposable electronic device includes a housing, a user interface in the housing and a short range, unlicensed wireless transceiver in the housing. A controller is configured to control the user interface and the short range, unlicensed wireless transceiver. A non-replaceable, non-rechargeable battery also is provided in the housing. New forms of disposable, proximity-based communications systems, devices and methods thereby may be provided.

15 Claims, 7 Drawing Sheets

DISPOSABLE, PROXIMITY-BASED COMMUNICATIONS SYSTEMS, DEVICES AND METHODS

FIELD OF THE INVENTION

This invention relates to electronic systems, devices and operational methods, and more specifically to disposable electronic systems, devices and operational methods.

BACKGROUND OF THE INVENTION

Disposable electronic devices are being increasingly made and used. As used herein, a "disposable electronic device" means an electronic device that includes a housing, electronic circuitry in the housing, and a non-replaceable, non-rechargeable battery in the housing that is configured to temporarily power the electronic circuitry until the non-replaceable, non-rechargeable battery discharges.

For example, it is known to provide greeting cards that play a tune, such as "Happy Birthday", upon opening. Moreover, disposable electronic devices may be included with children's fast food meals, and may include voice recorders, lights and/or other electronic features. These disposable electronic devices may be used to promote a movie, book, television program or other entertainment venture.

SUMMARY OF THE INVENTION

Disposable electronic devices according to some embodiments of the present invention include a housing, a user interface in the housing, and a short range, unlicensed wireless transceiver in the housing. A controller is provided in the housing that is configured to control the user interface and the short range, unlicensed wireless transceiver. A non-replaceable, non-rechargeable battery also is provided in the housing that is configured to power the user interface, the short range, unlicensed wireless transceiver, and the controller, until the non-replaceable, non-rechargeable battery discharges. By providing a short range, unlicensed wireless transceiver in a disposable electronic device housing, according to some embodiments of the present invention, new forms of disposable, proximity-based communications systems, devices and methods may be provided.

In some embodiments, the user interface includes a light source, a sound source and/or a user input device, such as a key or button. In some embodiments, the controller is configured to receive a message from the short range, unlicensed wireless transceiver, and to control the user interface and to transmit a message via the short range, unlicensed wireless transceiver in response thereto. In still other embodiments, the controller is configured to receive a message from the short range, unlicensed wireless transceiver, and to control the short range, unlicensed wireless transceiver to transmit a message in response thereto and in further response to occurrence of a predetermined condition. In some embodiments, the predetermined condition comprises activation of the user interface and/or expiration of a predetermined time. In still other embodiments, the controller is configured to ignore receipt of a message from the short range, unlicensed wireless transceiver in response to occurrence of a predetermined condition.

In some embodiments, the housing has an external appearance that is related to an entertainment event where the disposable electronic device is distributed or used. In other embodiments, the housing also includes an admission ticket for the entertainment event.

Other embodiments of the invention provide an entertainment method for a venue wherein messages are caused to pass among a plurality of disposable electronic devices at the venue that are carried by attendees of the venue. The disposable electronic devices include a housing, a short range, unlicensed wireless transceiver in the housing that is configured to receive and transmit messages, and a non-replaceable, non-rechargeable battery in the housing that is configured to power the short range, unlicensed wireless transceiver until the non-replaceable, non-rechargeable battery discharges.

In some embodiments, prior to causing the messages to pass among the devices, the plurality of disposable electronic devices are distributed to the attendees of the venue. In other embodiments, the disposable electronic devices are caused to emit audible and/or visible signals in response to the messages that pass among the plurality of devices at the venue. In still other embodiments, the electronic devices continue to emit the audible and/or visible signals until the non-replaceable, non-rechargeable batteries discharge. The audible and/or visible signals may be emitted sequentially and/or simultaneously by the electronic devices in response to the messages. Moreover, in other embodiments, the messages contain therein attendee input selections that are provided to a user interface of a respective device by a respective attendee. In yet other embodiments, an initial message is loaded in at least one of the disposable electronic devices, to thereby cause the messages to pass among the plurality of devices.

In yet other embodiments of the invention, a plurality of first disposable electronic devices are provided at a first venue. In these embodiments, messages may also be caused to pass among a plurality of second disposable electronic devices at a second venue that are carried by attendees of the second venue. At least one of the first disposable electronic devices is linked with at least one of the second disposable electronic devices via a wide area network.

Communication methods according to other embodiments of the invention cause two or more disposable electronic devices that are carried by two or more individuals, to interact with one another in response to the two or more disposable electronic devices being proximate to one another. In other embodiments, the devices interact with each other by causing the devices to emit audible and/or visible signals sequentially and/or simultaneously in response to the devices being proximate to one another. Moreover, in other embodiments, the devices cease interacting with one another in response to the devices no longer being proximate to one another. In some embodiments, these interactions are independent of interaction by the two or more individuals with the two or more disposable electronic devices. Accordingly, autonomous, disposable, proximity-based communications, systems, methods and/or electronic devices may be provided, to allow unique instantiations according to various embodiments of the present invention.

It will be understood that embodiments of the invention have been described above primarily in connection with devices and methods. However, analogous communications and/or entertainment systems may be provided according to other embodiments of the present invention.

Other systems, methods, and/or computer program products will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
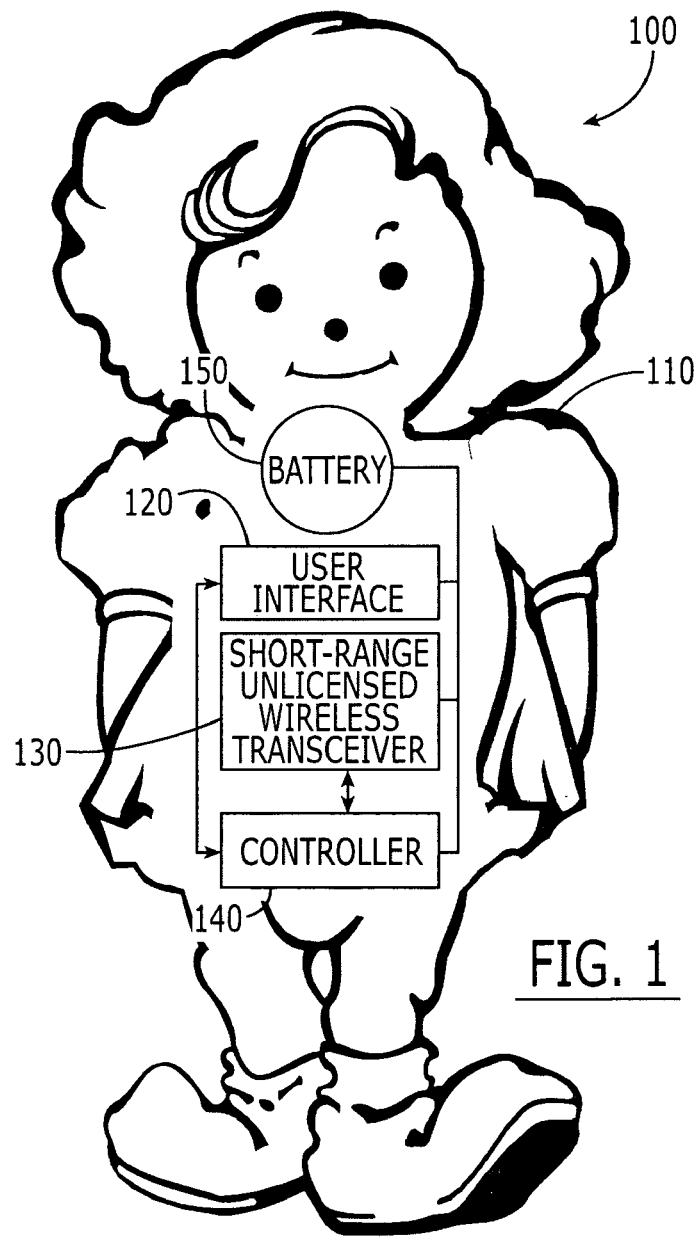
FIG. 1 illustrates a disposable electronic device according to various embodiments of the present invention, including a block diagram of internal components thereof.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element. Thus, a first device discussed below could be termed a second device without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams of methods, systems, devices and computer program products according to embodiments of the invention. It will be understood that a block of the block diagrams, and combinations of blocks in the block diagrams, may be implemented at least in part by computer program instructions. These computer program instructions may be provided to a controller of a device, such that the instructions, which execute via the controller create means, modules, devices or methods for implementing the functions/acts specified in the block diagram block or blocks.

These computer program instructions may also be stored in a memory on the device that can direct a controller of a device to function in a particular manner, such that the instructions stored in the memory produce an article of manufacture including computer-readable program code which implements the functions/acts specified in block diagram block or blocks. The computer program instructions may also be loaded onto a controller of a device to cause a series of operational steps to be performed to produce a computer implemented process such that the instructions which execute on the controller provide steps for implementing the functions/acts specified in the block diagram block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 illustrates a disposable electronic device according to various embodiments of the present invention. As shown in FIG. 1, a disposable electronic device 100 includes a housing 110, a short range, unlicensed wireless transmitter and receiver (transceiver) 130 in the housing 110, a controller 140 in the housing 110 and a non-rechargeable battery 150 in the housing 110. It will be understood that the term "battery" is used generically to cover any electricity storage device, such as a fuel cell.

Still referring to FIG. 1, the housing 110 may be fabricated of hard plastic, soft plastic, metal and/or other conventional materials, and may be in the shape of a human or animal figure, a toy, a vehicle or other item. The housing is configured so as to prevent the replacement and recharging of the battery 150. The short range, unlicensed wireless transceiver 130 may include an infrared, ultrasonic and/or radio frequency transmitter that is operable over a short range, which does not require a regulatory license for operation and which does not require credentials for participation. In some embodiments, the short range is about 100 feet or less. In other embodiments, the short range is about 25 feet or less. In still other embodiments, the short range is about 5 feet or less, such that an ad hoc network is formed once a venue is filled with attendees. Exemplary short range, unlicensed wireless transceivers 130 include infrared transceivers, ultrasonic transceivers, Bluetooth transceivers, Family Radio Service (FRS) transceivers and/or Radio Frequency ID (RFID) transceivers. Combinations of technologies, such as Bluetooth over infrared, also may be used. Visible light at a particular frequency or frequencies also may be used. Other short range, unlicensed wireless transceivers that are available or are developed hereafter may also be used.

The controller 140 in the housing 110 can include a logic circuit and/or a general purpose and/or special purpose processor which may run under stored program control. The controller 140 is configured to control the user interface and the short range, unlicensed wireless transceiver 130, to provide entertainment and/or communication systems and/or methods, as will be described in detail below. The controller 140 may include a microprocessor or an Application-Specific Integrated Circuit (ASIC) in some embodiments. For simplicity, however, in some embodiments, the controller 140 may include a small number of logic gates that can be configured to execute a limited set of functions without providing the full functionality of a microprocessor or an ASIC. The non-replaceable, non-rechargeable battery 150 includes any battery or batteries (or other electricity storage source) having sufficient power to temporarily power the user interface 120, the short range, unlicensed wireless transceiver 130 and a logic circuit 140, for a finite period of time, which may be on the order of hours or days, until the non-replaceable, non-rechargeable battery discharges. Thereafter, the housing 110 may be used as a passive toy without the user interface 120, the wireless transceiver 130 and the controller 140 being operable.

Figure 2:
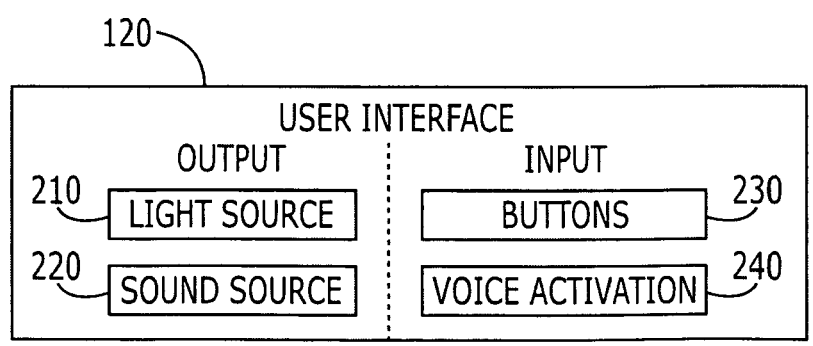
FIG. 2 is a block diagram of user interfaces according to embodiments of the present invention.

FIG. 2 is a block diagram of user interfaces 120 according to exemplary embodiments of the present invention. As shown in FIG. 2, the user interface 120 may include an output user interface and input user interface. The output user interface may include one or more light sources 210, such as light emitting diodes, lasers and/or conventional lamps of single or multiple colors. A sound source 220 may be provided to provide beeps, tones and/or synthesized and/or recorded sound output. Sound sources may include buzzers and/or speakers. The input user interface may include one or more buttons 230 that may be used to activate/deactivate various functions or to indicate a user response. As used herein, the term "buttons" includes keys and switches. A voice activation system 240 also may be provided that can be responsive to voice signals or commands. Other user interface components for user input or output that are known or developed subsequently also may be provided. It also will be understood that, although the light source and sound source are indicated as part of a user interface, the light source and sound source may be visible and/or audible by individuals other than the user of the disposable electronic device as well.

Figure 3:
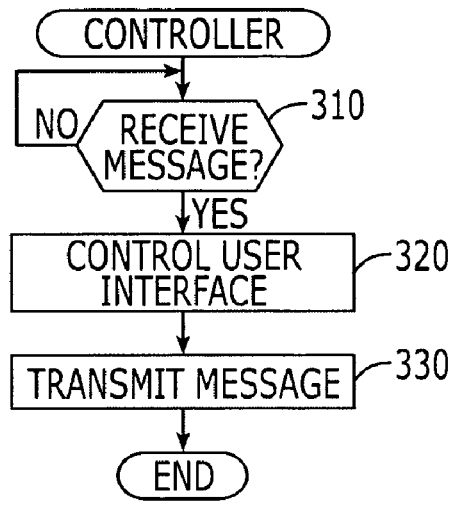
FIGS. 3-5 are flowcharts of operations that may be performed by a controller according to various embodiments of the present invention.

FIG. 3 is a flowchart of operations that may be performed by a controller, such as the controller 140 of FIG. 1, to control disposable electronic devices, such as the disposable electronic device 100 of FIG. 1, according to various embodiments of the present invention. As shown in FIG. 3, at Block 310, a message is received from another device via the short range, unlicensed wireless transceiver 130. In response, the user interface 120 is controlled at Block 320 and a message is transmitted to another device via the short range, unlicensed wireless transceiver 130, at Block 330. It will be understood that the functions of Blocks 320 and 330 may occur out of the order shown or simultaneously. Accordingly, in some embodiments of FIG. 3, upon receipt of a message from another disposable electronic device, the light source 210 and/or sound source 220 may be activated, and a message is sent to yet another disposable electronic device for receipt thereby.

Figure 4:
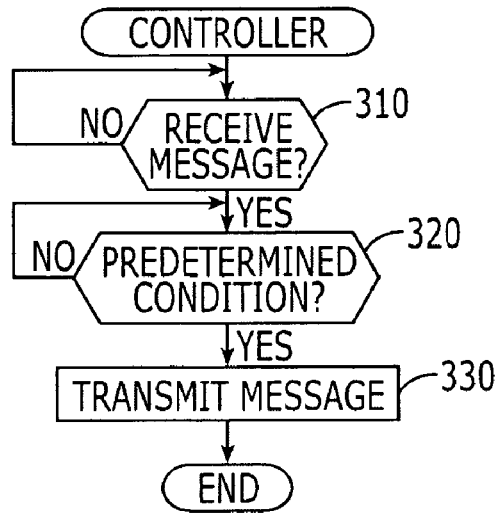

FIG. 4 is a flowchart of other operations of controllers according to other embodiments of the present invention. In embodiments of FIG. 4, after receipt of the message from another device via the short range, unlicensed wireless transceiver at Block 310, a determination is made at Block 320 as to whether a predetermined condition has occurred. Upon occurrence of the predetermined condition, the operations to transmit a message are performed at Block 330. In some embodiments, the predetermined condition can be activation of an input button 230 or voice activation 240 of an input user interface, to indicate a user's selection. In other embodiments, the predetermined condition can be expiration of a predetermined time after receipt of the message at Block 310. Other predetermined conditions may be provided by the controller, to provide various entertainment and/or communications systems and/or methods, as will be described further detail below.

Figure 5:
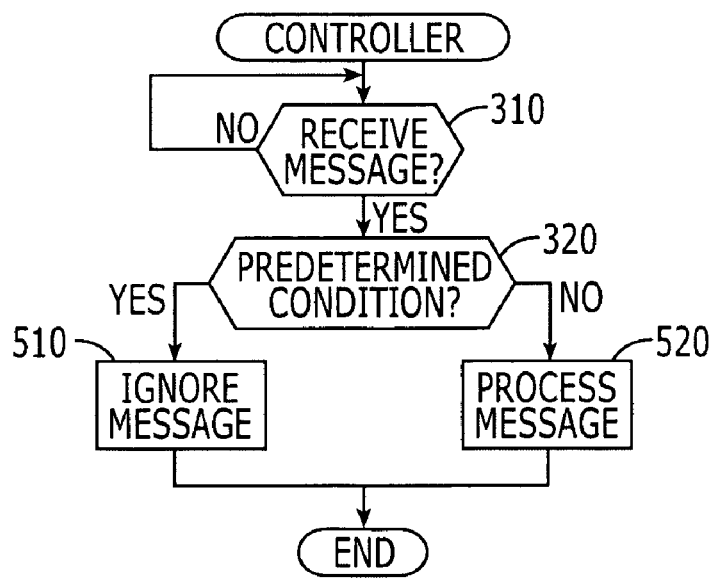

FIG. 5 is a flowchart of operations that may be performed by other embodiments of controllers. More specifically, as shown in FIG. 5, upon occurrence of a predetermined condition at Block 320, the message may be ignored at Block 510, whereas if the predetermined condition does not occur at Block 320, then the message can be processed at Block 520. For example, at Block 320 of FIG. 5, the predetermined condition may be prior receipt of a message, such that a subsequent message is ignored at Block 510, whereas a first message is processed at Block 520. Thus, in some embodiments, the user interface 120 may only be activated a single time in response to a message that is received from another device. In other embodiments, a message may be processed at Block 520 upon occurrence of a predetermined condition, and ignored if the predetermined condition does not occur. Thus, for example, if the user does not provide a desired input, then the message may be ignored, whereas if the user provides a desired input, the message can be processed.

Figure 6:
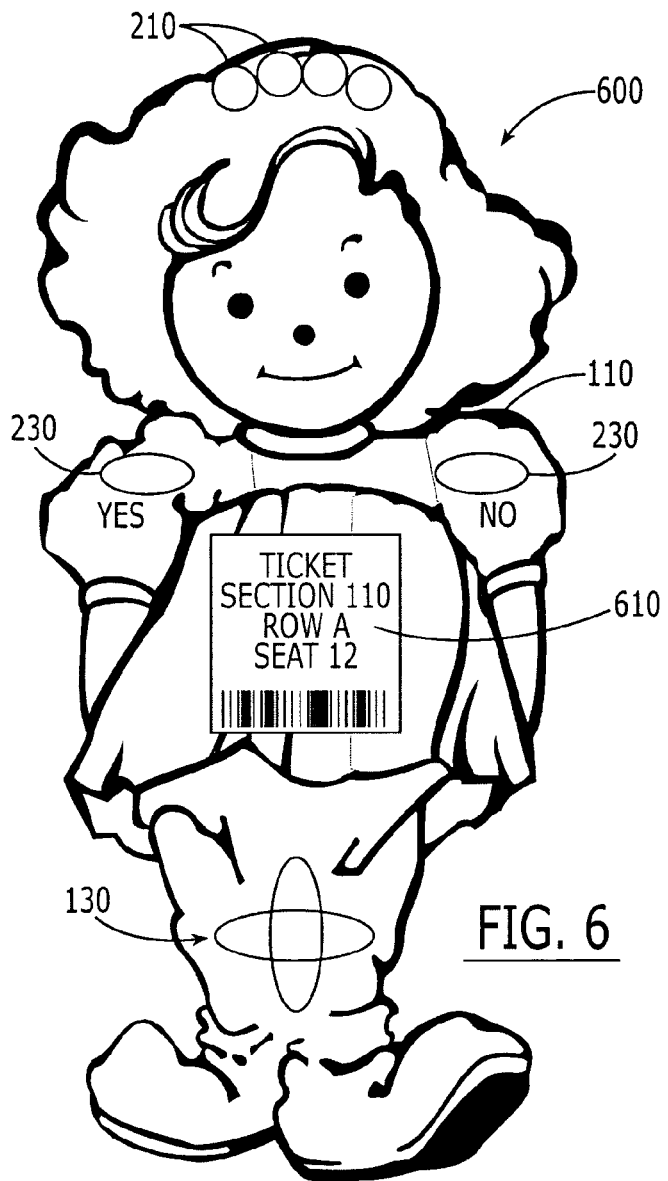
FIG. 6 illustrates a disposable electronic device according to other embodiments of the present invention including a ticket on the housing thereof.

FIG. 6 illustrates a disposable electronic device 600 according to other embodiments of the present invention. As shown in FIG. 6, the housing 110 may be in the shape of a movie character or an entertainer. The electronic device 600 may be distributed at a restaurant, such as a fast food restaurant, in connection with a movie promotion or other entertainment promotion. Alternatively, an entertainer-shaped device 600 may be distributed with each ticket purchased for an entertainment, such as a concert. In other embodiments, the disposable electronic device 600 may be received by each attendee at the entertainment event itself, and may even include a printed ticket 610 on the housing 110. In some embodiments, the housing 110 may be approximately 3" tall. However, smaller or larger housings may be used.

Still referring to FIG. 6, in these embodiments, a user interface light source 210 may be provided using, for example, a series of light emitting diodes. "Yes" and "no" user input buttons 230 may be provided. In some embodiments, holding down one of the buttons 230, such as "yes", may automatically light up the lights 210. A short range, unlicensed wireless transceiver 130 may be embedded in the housing 110. The short range, unlicensed wireless transceiver can be configured to receive and transmit very close, very specific unlicensed band transmissions, for example, to enable communications within a 5 foot maximum range.

In some embodiments, the transceiver 130 may use two directional antennas that are oriented, for example, at 90° angles from each other, so that transmissions are only received in a first direction and are transmitted in a second direction. In other embodiments, other techniques may be used to receive transmissions in one direction and to transmit in another direction. Moreover, in still other embodiments, omnidirectional transmitting and receiving, or transmitting and receiving in the same direction, may be used.

Still referring to FIG. 6, a controller may be provided (not shown in FIG. 6). The controller may be operable to decide what to do when a message such as a trigger pulse is received from another device. In some embodiments, immediate relay may be provided to another device. In other embodiments, the controller may wait a predetermined time and then transmit. In yet other embodiments, only reception may take place without transmission. In still other embodiments, transmissions may be ignored for a predetermined time after receiving a first trigger pulse. In other embodiments, the lights 210 are controlled to immediately activate or to activate after a predetermined duration, and the duration of activation also may be controlled by the controller.

Figure 7:
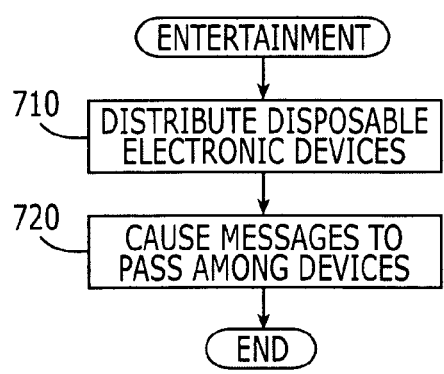
FIGS. 7-9 are flowcharts of operations that may be performed for entertainment according to various embodiments of the present invention.

FIG. 7 is a flowchart of entertainment methods and systems according to various embodiments of the present invention. As shown in FIG. 7, a plurality of disposable electronic devices are distributed to attendees of a venue. As used herein, a "venue" denotes an area where a plurality of electronic devices will be used together to form an ad hoc network. Thus, a venue may be an entertainment venue (museum, concert, sports, show or other entertainment venue) or a food and/or beverage venue (restaurant, coffee shop, bar and/or club), where devices will be used together. Thus, in some embodiments of the present invention, a kit may be provided wherein a disposable device according to embodiments of the present invention and a food item are distributed together in a package.

Referring to Block 710, the portable electronic devices may be distributed at the venue, for example upon admission to the venue or as part of a food package or ticket that is distributed at the venue, or may be distributed outside the venue in an area that is adjacent the venue or remote from the venue. Thus, for example, disposable electronic devices may be mailed to attendees of an event together with, or as, their tickets.

Referring now to Block 720, messages are caused to pass among a plurality of disposable electronic devices at the venue that are carried by attendees at the venue. In these embodiments, the disposable electronic devices can include a housing, a short range, unlicensed wireless transceiver in the housing that is configured to receive and transmit the messages, and a non-replaceable, non-rechargeable battery in the housing that is configured to power the short range, unlicensed wireless transceiver, until the non-replaceable, non-rechargeable battery discharges. Accordingly, in these embodiments, messages may be relayed from device to device, when the devices are proximate one another at the venue.

Figure 8:
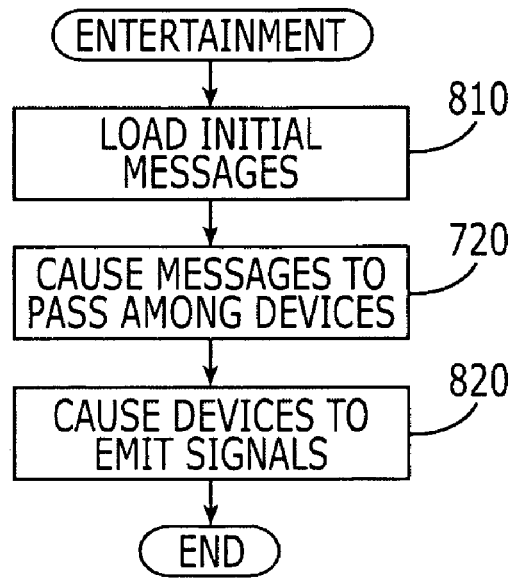

FIG. 8 is a flowchart of other embodiments according to the present invention. In these embodiments, an initial message is loaded in at least one of the plurality of disposable electronic devices at Block 810. Thereupon, at Block 720, the messages are caused to pass among the plurality of disposable electronic devices at the venue that are carried by attendees of the venue. At Block 820, the plurality of disposable electronic devices are caused to emit audible and/or visible signals, for example using the light source 210 and/or the sound source 220, in response to the messages that pass among the plurality of disposable electronic devices at the venue.

Figure 9:
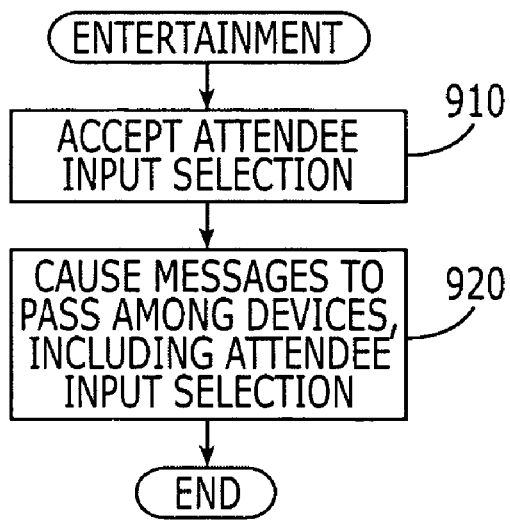

FIG. 9 is a flowchart of other embodiments. Referring to FIG. 9, at Block 910, an attendee input selection is accepted, for example using the buttons 230 and/or voice activation 240. Then, at Block 920, messages are caused to pass among the devices, wherein the messages include the attendee input selection. Attendee voting at a venue, for example, voting for a particular song, thereby may be tallied among the attendees.

Figure 10:
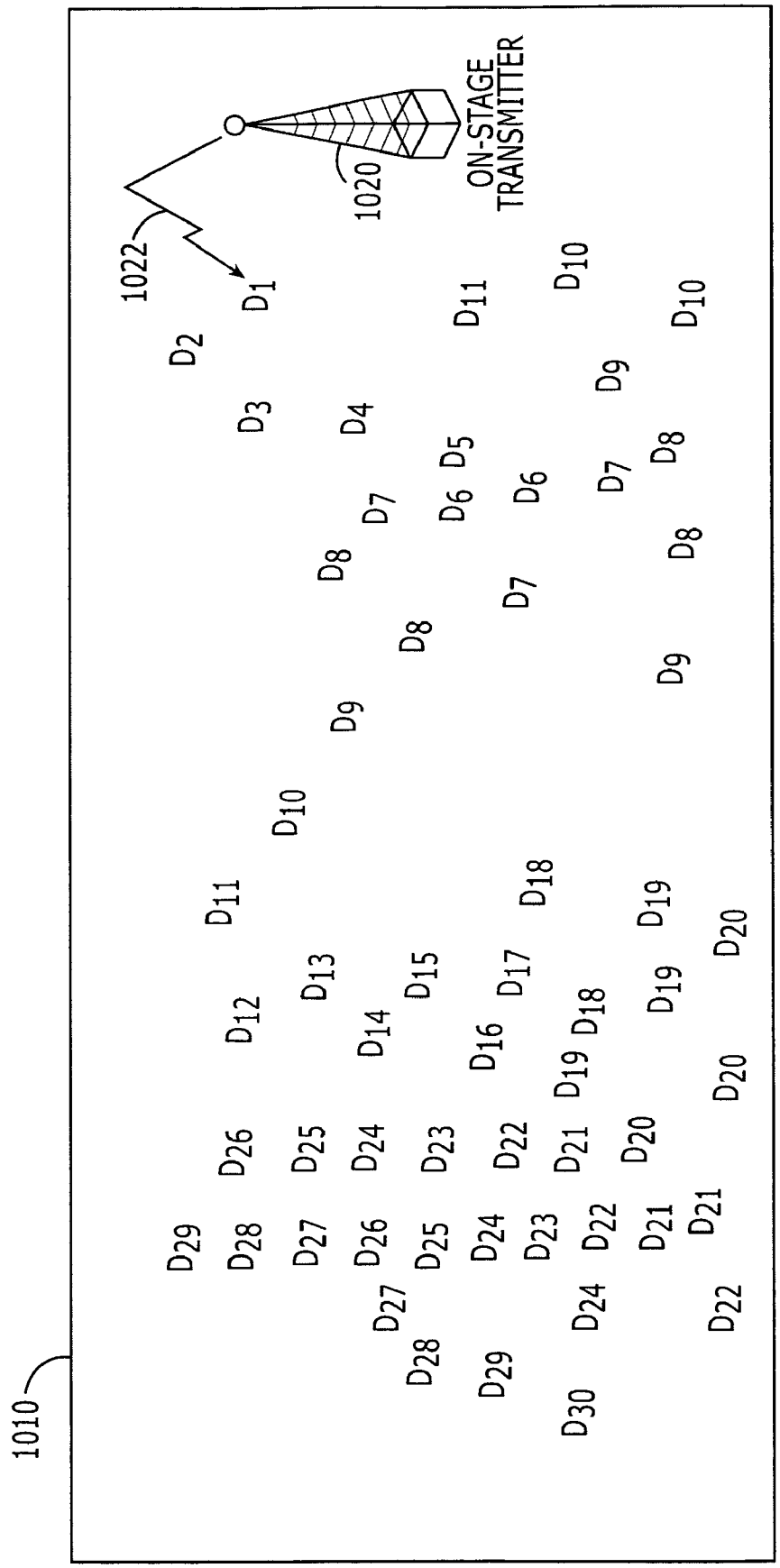
FIG. 10 schematically illustrates entertainment operations according to FIG. 8.

FIG. 10 schematically illustrates how a plurality of disposable electronic devices may provide entertainment at a venue 1010. As shown in FIG. 10, an on-stage transmitter 1020 may provide an initial message 1022 to a first disposable electronic device or devices $D_1$, as was described in connection with Block 810. Then, messages are caused to pass among the remaining devices, as was described in Block 720, in a sequence shown by the subscripts for the various devices D in FIG. 10. In some embodiments, each triggered device turns on its light source 210, to illuminate. Each triggered light source may stay on for a predetermined interval or a communicated interval. After a decay interval, the lights once again may go out. Accordingly, a "light wave" or "ripple" may be generated across a venue in response to the on-stage transmitter 1020.

Figure 11:
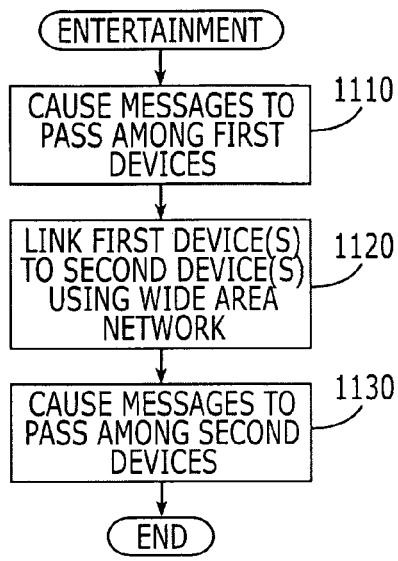
FIG. 11 is a flowchart of operations that may be performed for entertainment across multiple venues according to various embodiments of the present invention.

FIG. 11 is a flowchart of other embodiments of the present invention. In these embodiments, multiple ad hoc networks of disposable electronic devices may be linked into a meta network using a wide area network. Thus, as shown in FIG. 11, at Block 1110, messages are caused to pass among a plurality of first disposable electronic devices at a first venue that are carried by attendees of the first venue. At Block 1120, one or more of the first devices are linked to one or more second devices at a second venue using a wide area network, such as a wired and/or wireless, public and/or private, telephone and/or data network, including cellular, satellite, walkie-talkie and/or microwave networks, and/or the Internet. Then, at Block 1130, messages are caused to pass among a plurality of second disposable electronic devices at a second venue that are carried by attendees of the second venue.

Figure 12:
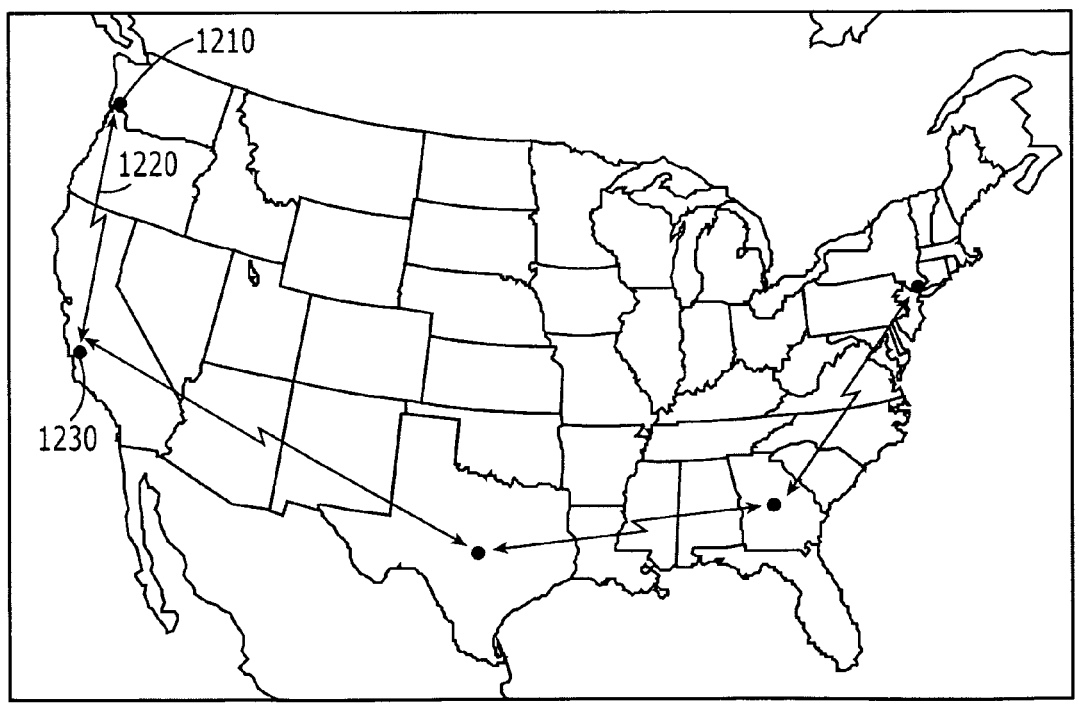
FIG. 12 schematically illustrates operations of FIG. 11.

FIG. 12 graphically illustrates embodiments of FIG. 11, wherein in a representation of the United States, messages are caused to pass among first devices at a first venue 1210. At least one first device is then linked to a second device using a wide area network 1220, to thereby cause messages to pass among second devices at a second venue 1230. A meta network thereby may be established, wherein multiple single venue instantiations can be assembled into a regional, national or global event. The event may be viewable by satellite or helicopter. Moreover, by linking coordinating transmitters that may be similar to the onstage transmitter 1020 of FIG. 10, multiple instantiations can be coordinated. An entire region, nation, continent or the globe can then become part of a synchronous and/or sequential display.

Figure 13:
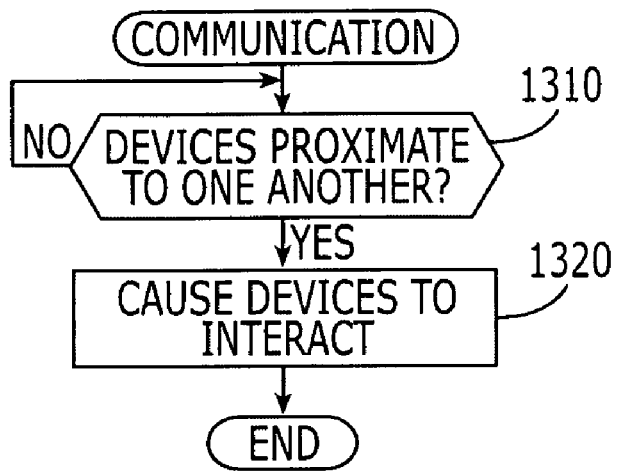
FIGS. 13 and 14 are flowcharts of operations that may be performed for communication among disposable electronic devices according to various embodiments of the present invention.

FIG. 13 is a flowchart of operations that may be provided according to other embodiments of the present invention. As shown in FIG. 13, a determination is made at Block 1310 as to whether two disposable electronic devices that are carried by two individuals are proximate to one another. If so, then at Block 1320, the devices may be caused to interact with one another. For example, light sources, sound sources and/or other output devices on the two devices may be activated simultaneously or sequentially, based on proximity. An ad hoc community of two or more devices thereby may be formed based on the devices interacting with one another upon the devices being proximate to one another. The ad hoc community may be formed independent of interaction by the individuals with the devices. The individuals who carry the devices may thereby be prompted to interact with one another based on the common interest that is indicated by the interacting disposable electronic devices. Accordingly, prior to entering a venue or after leaving a venue, individuals may be automatically identified to one another as being a fan of a particular movie, entertainer, sports team, etc., and interaction may thereby be promoted among the individuals.

Figure 14:
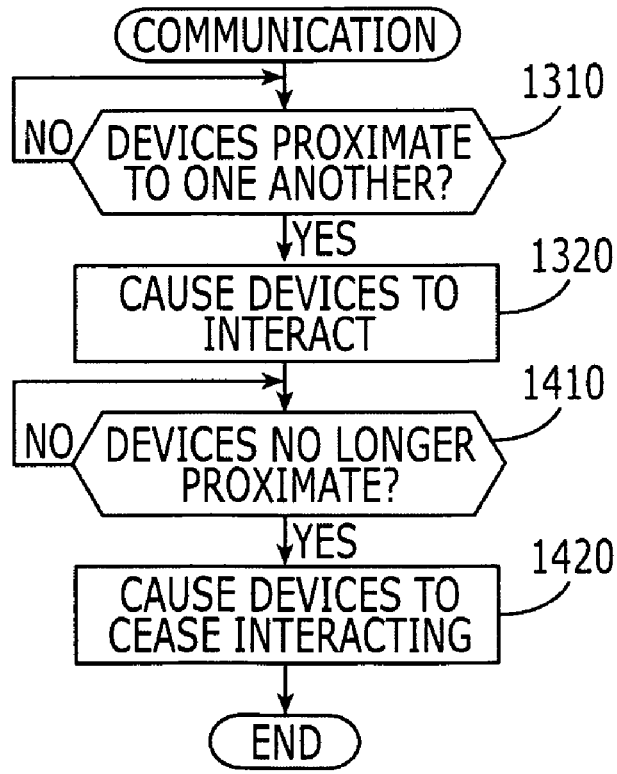

FIG. 14 is a flowchart of other embodiments of the present invention. In these embodiments, once the devices are no longer proximate to one another, the devices cease interacting at Block 1420.

Additional discussion of various embodiments of the present invention now will be provided. Embodiments of the present invention can provide autonomous, disposable, proximity-based communications systems, methods and/or devices that can provide unique instantiations, such as group-modulated lighting, voting and/or collaborative content control. These instantiations may be provided within a proximity and also may be distributed via wide area networks. Accordingly, embodiments of the invention can allow the rapid assembly of large groups of people to inter-network and dynamically create unique, proximity-centric instantiations anonymously.

Some embodiments of the present invention may arise from a recognition that the cost of disposable electronic devices has drastically decreased, so that toys now being given away with fast food restaurant meals can include voice recorders, lights and/or other electronic features. These devices may be augmented, according to various embodiments of the present invention, to include simple inter-networking wireless transceivers (receivers and transmitters), and can be provided with an ability to perform a very limited set of responses to provide unique instantiations. Entertaining, advertising-related and/or other displays of inter-networked disposable devices thereby may be created.

Some embodiments of the present invention can create an electronic analog to concertgoers holding up cigarette lighters in the 1960s, or breaking chemical plastic candles in the 1990s, or cell phones being used to call outsiders by concert-goers in the 2000s. Electronic analogs also may be created to the even earlier "wave", where each person/group in a larger group act together to create a ripple, create a word, or simply create an entertaining large scale instantiation. Other events have used the issuance of specific cards to specific attendees with instructions on how and when to hold up a specific card in order to create an enormous word. Embodiments of the present invention can provide electronic analogs to these instantiations, as well as unique instantiations that can be created by virtue of the unlicensed wireless transceivers and controllers that are provided in the housings of disposable electronic devices according to various embodiments of the present invention.

Embodiments of the present invention may be used at any venue where groups of people gather, such as at concerts, road races, waiting rooms, sports games, restaurants, theatres, etc. Disposable electronic devices, systems and methods according to embodiments of the present invention can be used to automatically entertain, to advertise, to instantiate visible patterns, such as letters and/or logos, and/or to provide automatically coordinated distributed content instantiation. Various configurations may be implemented. For example, a single participant can initiate a beginning of an electronic "wave" that, in turn, is rippled through the rest of the participants. An alternative trigger may come from the venue itself, as was illustrated in FIG. 10, in order to control the audience level output. In these embodiments, the crowd becomes part of the show itself, in that the light show onstage can be interconnected with everyone in the venue.

Other embodiments of the present invention can provide an input interface on the disposable devices themselves, as was illustrated in FIGS. 1-3 and 6. For example, two or three buttons 230 may allow each user to add their input onto how the entire venue should look, thereby placing the stage lighting or other features of the event and/or venue under the attendees' control. This may provide a collaborative voting method using input from disposable devices. When three buttons are provided, one could be "yes", one "no", and another button may be provided to allow divisional branches and input into the proximity-based community.

As was also illustrated in FIGS. 11 and 12, group instantiation may also be carried out across separated venues, where each venue may be interconnected using conventional communications networks, but the venues each use devices, systems and/or methods as described herein. Accordingly, devices may be enabled with rudimentary lighting options, receiving and transmission circuitry, and simplistic rule bases, in order to allow operation within a proximity group, according to some embodiments of the present invention. Limited functionality can be affected. These devices may be provided at about the same quality and cost as is currently provided by toys included with restaurant meals at fast food restaurants.

Accordingly, some embodiments of the present invention can leverage an ad hoc network for entertainment purposes and/or for specific letter and/or logo instantiations in a crowd, to show things on a very large scale. Each device within the transmit/receive distance limits can be triggered by a message, and can pass on a trigger message. The local event at each individual device could be to light the light for a set duration, or the duration setting also could be transmitted. There could, therefore, be a ripple effect to the transmission of visible communications, with the visible decay and dying out of the first to be lit.

Many other instantiations can be provided according to other embodiments of the present invention. For example, as was described in connection with FIGS. 8 and 10, a transmitter at the venue could begin the trigger from a lighting event on the stage, so as to augment the stage lighting with every one of the devices of the attendees in the crowd, thereby involving each attendee. Other venues could be inter-networked, as was described in FIGS. 11-12, using traditional communications circuits, in order to create a mass, distributed, coordinated event, which could span a town, a country or the globe. Thus, a "Feed the Hungry" or other similar series of events across the planet could all be coordinated down to the individuals in attendance.

In other embodiments, the instantiation need not necessarily be light, but could also be a buzzer or one of several tones, or all other manners of outputs. Accordingly, embodiments of the present invention can create "group art" using sound, light and/or other outputs.

Added input features also can be included on a disposable electronic device according to other embodiments of the present invention, to facilitate altering the ad hoc interaction. For example, the inclusion of a "yes" button and a "no" button of FIG. 6 can allow, for example, group voting at a venue. It could also allow the modulation of an otherwise lock step instantiation, such as the ripple effect shown in FIG. 10, with more complex output, by allowing each device in the chain to alter the transference of the effect. In the disposable electronic device, at least one transmitter event may occur, which may be communicated to subsequent devices in a viral manner, by reaching the next available receiver in proximity. Each device can then either wait a predetermined interval to take action locally, such as to light its light, and then can pass the signal to the next available device. In other embodiments, a unique number may be included in the initial message, so that if a number comes back around, a comparator in each controller can determine if it should be allowed to go around again, or that it has been around once, and that is enough. A local comparison, therefore, may determine that it has already seen a message number, such as "A37", so the local device will not transmit that message again.

In other embodiments, the yes/no buttons of FIG. 6 may provide voting buttons, so that attendees may also vote and thereby choose or alter the content of the venue. For example, in a given concert, the attendees can vote on each song, and the singer can play the most wanted songs. Alternatively, attendees could vote on the volume at the venue using the devices. Thus, inclusion of the attendees can dynamically alter the content that the attendees are consuming.

Embodiments of the present invention can, therefore, provide entertainment, collaboration, internetworking and/or communication. The housing of electronic devices according to embodiments of the invention may be configured to look like a cheap cell phone, a doll or any other object. Moreover, as described in FIGS. 13-14, people may just find it interesting to see what impromptu networks they could become a part of, either at the initial venue, before and/or later, for example walking home or later at the grocery store or in the street. Accordingly, a user could find a community as the user travels about.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A disposable electronic device comprising:
a housing that has an external appearance that is related to an entertainment event;
a light source and/or a sound source in the housing;
a short range, unlicensed wireless transceiver in the housing;
a controller in the housing that is configured to activate the light source and/or the sound source and to transmit an outgoing message via the short range, unlicensed wireless transceiver, in response to a first receipt of an incoming message at the short range, unlicensed wireless transceiver, and to ignore a second receipt of the incoming message at the short range, unlicensed wireless transceiver; and
a non-replaceable, non-rechargeable battery in the housing that is configured to power the user interface, the short range, unlicensed wireless transceiver and the controller until the non-replaceable, non-rechargeable battery discharges.

2. A device according to claim 1 wherein the controller is configured to activate the light source and/or the sound source and to transmit the outgoing message via the short range, unlicensed wireless transceiver in response to the first receipt of the incoming message at the short range, unlicensed wireless transceiver and in further response to occurrence of a predetermined condition.

3. A device according to claim 2 wherein the predetermined condition comprises activation of the user interface and/or expiration of a predetermined time.

4. A device according to claim 1 wherein the housing has an external appearance of a human or animal figure, a toy or a vehicle.

5. A device according to claim 1 wherein the housing includes an image of an admission ticket for the entertainment event on an external surface thereof.

6. An entertainment method for a plurality of venues comprising:
causing messages to pass among a plurality of first disposable electronic devices at a first venue that are carried by attendees of the first venue, the first disposable electronic devices including a housing having an external appearance that is related to an entertainment event at the first venue, a short range, unlicensed wireless transceiver in the housing that is configured to receive and transmit the messages and a non-replaceable, non-rechargeable battery in the housing that is configured to power the short range, unlicensed wireless transceiver until the non-replaceable, non-rechargeable battery discharges, such that the messages that pass among the plurality of first disposable electronic devices at the first venue facilitate entertainment of the attendees of the venue;
causing messages to pass among a plurality of second disposable electronic devices at a second venue that are carried by attendees of the second venue, the second disposable electronic devices including a housing, a short range, unlicensed wireless transceiver in the housing that is configured to receive and transmit the messages and a non-replaceable, non-rechargeable battery in the housing that is configured to power the short range, unlicensed wireless transceiver until the non-replaceable, non-rechargeable battery discharges; and
linking at least one of the first disposable electronic devices with at least one of the second disposable electronic devices via a wide area network.

7. A method according to claim 6 wherein causing messages to pass among the plurality of first disposable electronic devices is preceded by:
distributing the plurality of first disposable electronic devices to the attendees of the first venue.

8. A method according to claim 6 further comprising:
causing the plurality of first disposable electronic devices to emit audible and/or visible signals in response to the messages that pass among the plurality of first disposable electronic devices at the first venue.

9. A method according to claim 8 wherein the audible and/or visible signals are emitted sequentially and/or simultaneously by the plurality of first disposable electronic devices in response to the messages that pass among the plurality of disposable electronic devices at the first venue.

10. A method according to claim 8 wherein the plurality of first disposable electronic devices continue to emit the audible and/or visible signals until the non-replaceable, non-rechargeable batteries discharge.

11. A method according to claim 6 wherein the messages contain therein attendee input selections that are provided to a user interface of a respective first disposable electronic device by a respective attendee who carries the respective first disposable electronic device.

12. A method according to claim 6 wherein causing messages to pass among the plurality of first disposable electronic devices is preceded by:
loading an initial message in at least one of the plurality of first disposable electronic devices.

13. A communication method comprising:
causing two disposable electronic devices that have a same external shape of an item of interest and that are carried by two individuals to automatically emit audible and/or visible signals sequentially and/or simultaneously in response to the two disposable electronic devices being proximate to one another and independent of interaction by the two individuals with the two disposable electronic devices, so as to automatically indicate to the two individuals who are proximate one another their mutual interest in the item of interest, and thereby facilitate social interaction between the two individuals.

14. A method according to claim 13 further comprising:
causing the two disposable electronic devices that are carried by the two individuals to automatically cease emitting the audible and/or visible signals sequentially and/or simultaneously in response to the two disposable electronic devices no longer being proximate to one another.

15. A method according to claim 13 wherein the item of interest comprises a human or animal figure, a toy and/or a vehicle.

* * * * *